United States Patent
Mu

(10) Patent No.: US 12,108,436 B2
(45) Date of Patent: Oct. 1, 2024

(54) PUSCH RECEIVING METHOD AND DEVICE, PUSCH SENDING METHOD AND DEVICE

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 320 days.

(21) Appl. No.: 17/627,650

(22) PCT Filed: Jul. 17, 2019

(86) PCT No.: PCT/CN2019/096415
§ 371 (c)(1),
(2) Date: Jan. 15, 2022

(87) PCT Pub. No.: WO2021/007822
PCT Pub. Date: Jan. 21, 2021

(65) Prior Publication Data
US 2022/0279524 A1 Sep. 1, 2022

(51) Int. Cl.
*H04W 72/56* (2023.01)
*H04L 1/00* (2006.01)
*H04W 72/0446* (2023.01)
*H04W 72/21* (2023.01)

(52) U.S. Cl.
CPC ............ *H04W 72/56* (2023.01); *H04L 1/0004* (2013.01); *H04W 72/0446* (2013.01); *H04W 72/21* (2023.01)

(58) Field of Classification Search
CPC . H04W 72/56; H04W 72/0446; H04W 72/21; H04W 72/04; H04W 72/11; H04L 1/0004; H04L 1/0025
See application file for complete search history.

(56) References Cited

U.S. PATENT DOCUMENTS

2021/0352699 A1* 11/2021 Lin ................... H04L 5/0057

FOREIGN PATENT DOCUMENTS

| CN | 111937470 A | * 11/2020 | ........ H04W 72/0413 |
|---|---|---|---|
| EP | 3509234 A1 | 7/2019 | |

OTHER PUBLICATIONS

European Patent Application No. 19937962.9, Search and Opinion dated Mar. 24, 2023, 14 pages.

(Continued)

*Primary Examiner* — Michael A Keller
(74) *Attorney, Agent, or Firm* — Cozen O'Connor

(57) ABSTRACT

A Physical Uplink Shared Channel (PUSCH) transmission method includes the following. It is determined that a first PUSCH overlaps with a second PUSCH in time domain. The first PUSCH is configured by semi-persistent scheduling and the second PUSCH is configured by dynamic scheduling. A relationship between a first priority of the PUSCH configured by the semi-persistent scheduling and a second priority of the PUSCH configured by the dynamic scheduling is determined. The first PUSCH is sent in an overlapped time domain in response to the first priority is greater than the second priority, or the second PUSCH is sent in an overlapped time domain in response to the second priority is higher than the first priority.

12 Claims, 9 Drawing Sheets

(56) References Cited

OTHER PUBLICATIONS

Vivo "Intra UE multiplexing for UL configured grant transmissions" 3GPP TSG RAN WG1 #96bis, R1-1904087, Apr. 2019, 3 pages.
Ericsson. "On Intra-UE Prioritization Enablers," 3GPP TSG RAN WG1 Meeting, #97 Tdoc R1-1906097, May 2019, 11 pages.
Ericsson. "On Intra-UE Prioritization Enablers," 3GPP TSG RAN WG1 Meeting, #96bis Tdoc R1-1904130, Apr. 2019, 10 pages.
PCT/CN2019/096415 International Search Report and Written Report, dated Apr. 15, 2020, 2 pages.

\* cited by examiner

PUSCH RECEIVING METHOD AND DEVICE, PUSCH SENDING METHOD AND DEVICE

CROSS-REFERENCE TO RELATED APPLICATION

This application is a national phase of International Application No. PCT/CN2019/096415, filed on Jul. 17, 2019, the content of which is hereby incorporated by reference in its entirety.

TECHNICAL FIELD

The disclosure relates to a field of communication technologies, and more particularly to a Physical Uplink Shared Channel (PUSCH) transmission method, a PUSCH transmission device, a PUSCH reception method, a PUSCH reception device, an electronic device, and a computer-readable storage medium.

BACKGROUND

In related arts, a base station can configure uplink resources in a dynamic scheduling manner or in a semi-persistent scheduling (or called configured grant) manner. Correspondingly, the Physical Uplink Shared Channel (PUSCH for short) sent by the terminal may be configured by dynamic scheduling or semi-persistent scheduling.

SUMMARY

In one embodiment, a PUSCH transmission method is provided. The method is performed by a terminal. The method includes:
  determining that a first PUSCH overlaps with a second PUSCH in time domain, in which the first PUSCH is configured by semi-persistent scheduling and the second PUSCH is configured by dynamic scheduling;
  determining a relationship between a first priority of the PUSCH configured by the semi-persistent scheduling and a second priority of the PUSCH configured by the dynamic scheduling; and
  sending the first PUSCH in an overlapped time domain in response to the first priority being higher than the second priority, or sending the second PUSCH in the overlapped time domain in response to the second priority being higher than the first priority.

In one embodiment, there is provided a PUSCH receiving method, performed by a base station. The method includes:
  receiving PUSCHs sent from a terminal;
  determining respective priorities for multiple PUSCHs contained in the received PUSCHs in response to the multiple PUSCHs overlapping in time domain;
  demodulating the multiple PUSCHs sequentially according to an order of priority from high to low;
  in which, the demodulating is stopped upon any one of the multiple PUSCHs is successfully demodulated or the demodulating is stopped after each of the multiple PUSCHs is demodulated.

In one embodiment, there is provided an electronic device including:
  a processor; and
  a memory, configured to store instructions executable by the processor;
  in which the processor is configured to execute a PUSCH transmission method of any one of the above embodiments.

In one embodiment, there is provided an electronic device including:
  a processor; and
  a memory, configured to store instructions executable by the processor;
  in which, the processor is configured to execute a PUSCH receiving method of any one of the above embodiments.

In one embodiment, there is provided a non-transitory computer readable storage medium, having computer programs stored thereon. When the programs are executed by a processor, a PUSCH transmission method of any one of the above embodiments.

In one embodiment, there is provided a non-transitory computer readable storage medium, having computer programs stored thereon. When the programs are executed by a processor, a PUSCH receiving method of any one of the above embodiments.

BRIEF DESCRIPTION OF THE DRAWINGS

In order to clearly describe the technical solutions of embodiments of the disclosure, the drawings required in describing the embodiments are briefly introduced. Obviously, the drawings in the following description are merely some embodiments of the disclosure. For the skilled person in the art, other drawings can be obtained based on these drawings without any creative labor.

DETAILED DESCRIPTION

The following will clearly and completely describe technical solutions of embodiments of the disclosure in conjunction with accompanying drawings in the embodiments of the disclosure. Obviously, the described embodiments are only a part of the embodiments of the disclosure, rather than all implementations. example. Based on the embodiments in the disclosure, all other embodiments obtained by those of ordinary skill in the art without creative work shall fall within the protection scope of the disclosure.

Figure 1:
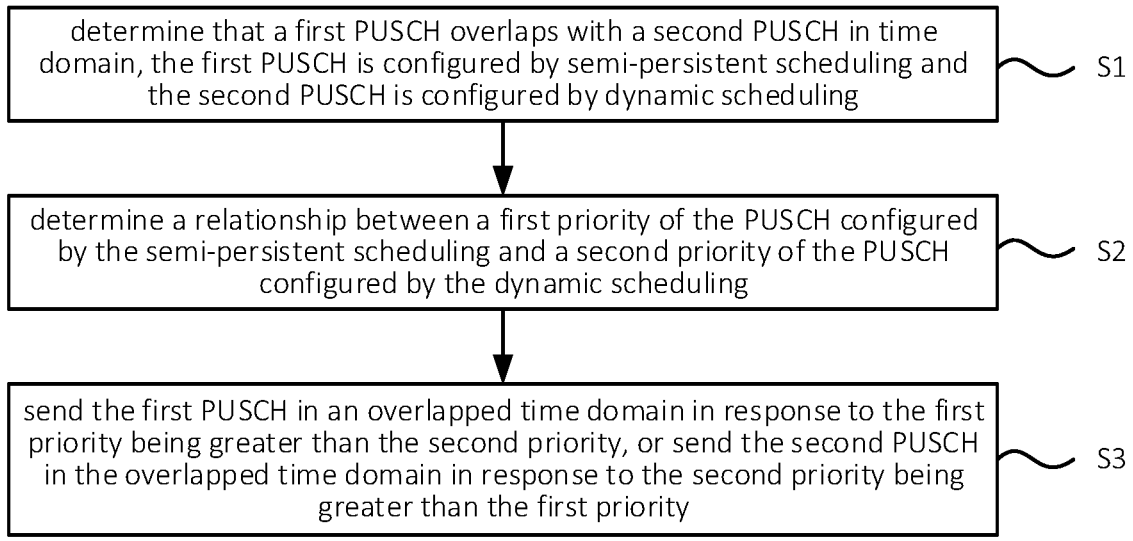
FIG. 1 is a schematic flowchart illustrating a PUSCH transmission method according to embodiments of the disclosure.

FIG. 1 is a schematic flowchart illustrating a PUSCH transmission method according to embodiments of the disclosure. As illustrated in FIG. 1, the PUSCH transmission method illustrated in this embodiment can be applied to a terminal. The terminal can be a mobile phone, a tablet computer, a wearable device, and other electronic devices. The terminal can communicate with a base station, for example based on 5G NR (New Radio).

As illustrated in FIG. 1, the PUSCH transmission method may include the following.

In block S1, it is determined that a first PUSCH overlaps with a second PUSCH in the time domain. The first PUSCH is configured by semi-persistent scheduling and the second PUSCH is configured by dynamic scheduling.

In an embodiment, the base station may configure the first PUSCH for the terminal through the semi-persistent scheduling and configure the second PUSCH for the terminal through the dynamic scheduling.

The first PUSCH is configured by the semi-persistent scheduling, which means that the terminal periodically sends the PUSCH based on a period configured by a base station. Further, the terminal can periodically send the PUSCH when receiving an active DCI (downlink control information) sent by the base station.

It is to be noted that for the PUSCH configured by the semi-persistent scheduling, the terminal does not necessarily transmit the PUSCH in every period. If the terminal needs to upload data in a certain period of PUSCH transmission, the terminal will upload the data through the PUSCH in that period. If there is no need to update data in a certain period of PUSCH transmission, the PUSCH in that period can be vacant.

The second PUSCH is configured by the dynamic scheduling, which means that the terminal sends the PUSCH based on specific time-frequency resources indicated by the uplink scheduling information (UL grant) sent by the base station, rather than sending the PUSCH periodically.

For the PUSCHs configured in the above two manners, the PUSCH configured by the semi-persistent scheduling can be sent without waiting for, by the terminal, the UL grant sent by the base station, and sending the PUSCH configured by the dynamic scheduling needs to wait for the UL grant from the base station.

Therefore, compared to the PUSCH configured by the dynamic scheduling, the PUSCH configured by the semi-persistent scheduling can reduce the latency of sending data by the terminal to the base station, and reduce an overhead of the communication between the base station and the terminal since the base station does not need to send the UL grants frequently to the terminal.

In an embodiment, the first PUSCH overlapping with the second PUSCH in the time domain means that the time domain resource corresponding to the first PUSCH partially overlaps with the time domain resource corresponding to the second PUSCH, or the time domain resource corresponding to the first PUSCH completely overlaps with the time domain resource corresponding to the second PUSCH.

In block S2, a relationship between a first priority of the PUSCH configured by the semi-persistent scheduling and a second priority of the PUSCH configured by the dynamic scheduling is determined.

In block S3, when the first priority is higher than the second priority, the first PUSCH is sent in the overlapped time domain, or when the second priority is higher than the first priority, the second PUSCH is sent in the overlapped time domain.

In one embodiment, the PUSCH configured by the base station for the terminal through the semi-persistent scheduling and the PUSCH configured for the terminal through the dynamic scheduling may have different priorities. Details on how to determine the relationship between the first priority and the second priority will be given in following embodiments.

In related arts, the PUSCH configured by the semi-persistent scheduling is designed, by default, for non-emergency services. Therefore, when the first PUSCH overlaps with the second PUSCH in the time domain, the terminal in the related arts may discard the first PUSCH and only send the second PUSCH.

However, with the study and development of communication technologies, considering the advantages, such as low uplink transmission latency and the low communication overhead, of the PUSCH configured by the semi-persistent scheduling, now the PUSCHs are configured in the semi-persistent scheduling manner for emergency services (such as ultra reliable and low latency communication (URLLC) service). Therefore, it is difficult to adapt to current communication scenarios by directly discarding the first PUSCH when the first PUSCH overlaps with the second PUSCH in the time domain.

According to embodiments of the disclosure, when the first PUSCH configured by the semi-persistent scheduling overlaps with the second PUSCH configured by the dynamic scheduling in the time domain, the first priority of the PUSCH configured by the semi-persistent scheduling is determined (the first priorities are determined for all PUSCHs configured by the semi-persistent scheduling, not limited to the first PUSCH) and the second priority of the PUSCH configured by the dynamic scheduling is determined (the second priorities are determined for all PUSCHs configured by the dynamic scheduling, not limited to the second PUSCH). In a case where the first priority is higher than the second priority, the first PUSCH is sent in the overlapped time domain. In a case where the second priority is higher than the first priority, the second PUSCH is sent in the overlapped time domain.

Accordingly, the terminal will not directly discard the first PUSCH. Rather, the terminal compares the priorities of the PUSCHs configured by the semi-persistent scheduling and the dynamic scheduling. Further, the terminal sends the PUSCH, configured by a corresponding scheduling manner, having the higher priority. Therefore, when the PUSCHs configured in the two scheduling manners face the services with different latency requirements, the priorities of the PUSCHs can be determined based on the latency requirement of each service, such that the PUSCH, configured in a corresponding scheduling manner, having the higher priority can be transmitted preferentially, to meet the latency requirement of the service.

For example, the latency allowed by the URLLC service is relatively low, while the latency allowed by the enhanced mobile broadband (eMBB) service is relatively high. The PUSCH configured by the semi-persistent scheduling is designed for the URLLC services and the PUSCH configured by the dynamic scheduling is designed for the eMBB services. The base station can instruct that the first priority of the PUSCH configured by the semi-persistent scheduling is higher than the second priority of the PUSCH configured by the dynamic scheduling, and the terminal can determine that the priority of the first PUSCH is higher, to send the first PUSCH on the overlapped time domain resources.

Figure 2:
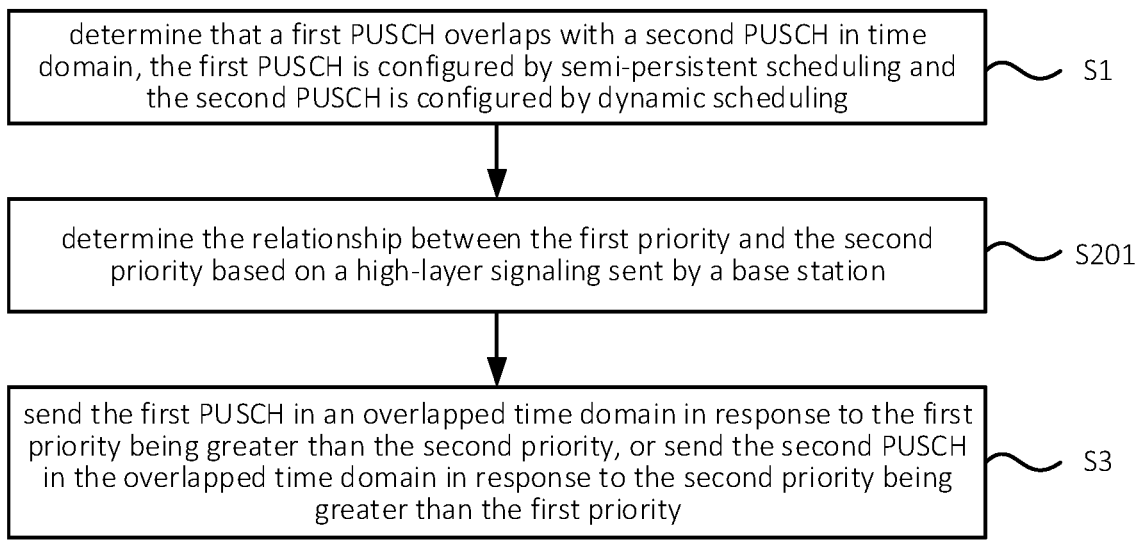
FIG. 2 is a schematic flowchart illustrating another PUSCH transmission method according to embodiments of the disclosure.

FIG. 2 is a schematic flowchart illustrating another PUSCH transmission method according to embodiments of the disclosure. As illustrated in FIG. 2, determining the relationship between the first priority of the PUSCH configured by the semi-persistent scheduling and the second priority of the PUSCH configured by the dynamic scheduling includes the following.

At block S201, the relationship between the first priority and the second priority is determined according to a high-layer signaling sent by the base station.

In an embodiment, the base station may indicate the relationship between the first priority and the second priority to the terminal by sending the high-layer signaling. The high-layer signaling includes at least one of: radio resource control (RRC) message and media access control (MAC) message.

In an embodiment, the base station can explicitly instruct the relationship between the first priority and the second priority to the terminal through the high-level signaling. That is, the base station indicates the first priority and the second priority by adopting some special bits. For example, the base station uses a first part of bits in the high-layer signaling to represent the first priority and uses a second part of bits in the high-layer signaling to represent the second priority.

In an embodiment, the base station can implicitly instruct the relationship between the first priority and the second priority to the terminal through the high-level signaling. That is, the base station instructs the first priority and the second priority by adopting bits of other information rather than the specific bits.

In detail, the manner of implicitly instructing the relationship between the first priority and the second priority to the terminal through the high-layer signaling can be given through the following embodiments.

Figure 3:
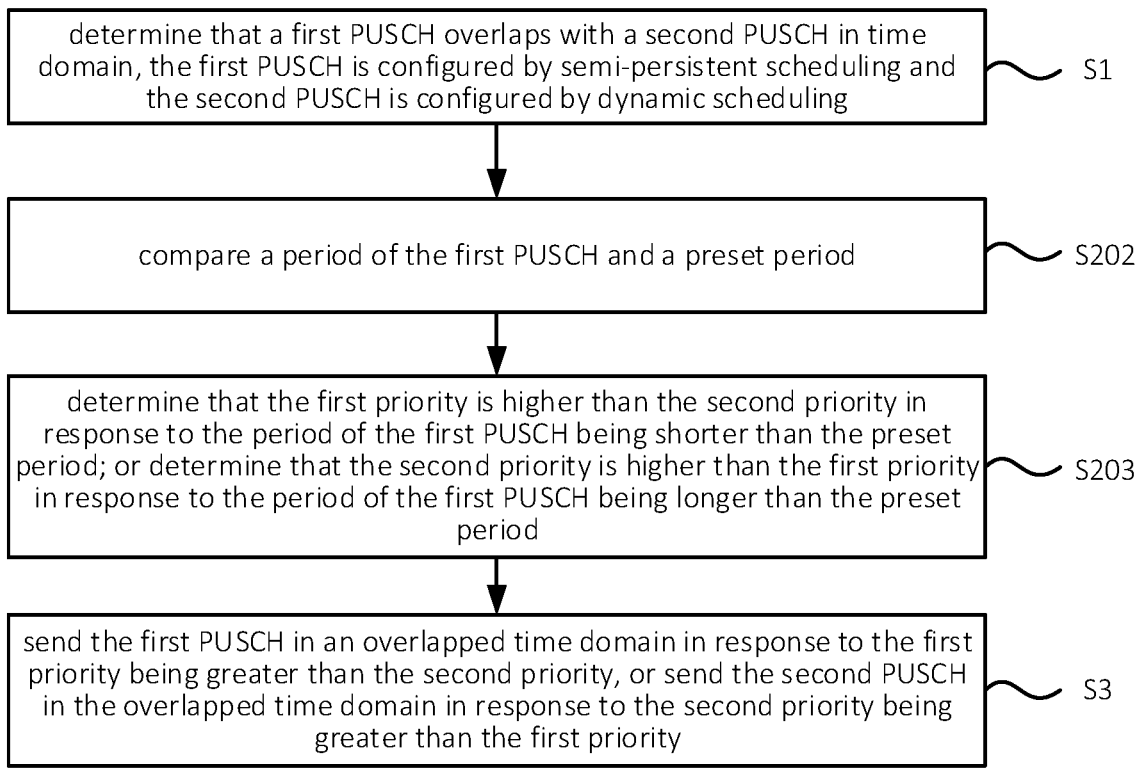
FIG. 3 is a schematic flowchart illustrating still another PUSCH transmission method according to embodiments of the disclosure.

FIG. 3 is a schematic flowchart illustrating still another PUSCH transmission method according to embodiments of the disclosure. As illustrated in FIG. 3, the high-layer signaling is configured to configure the terminal to compare a period of the first PUSCH with a preset period. Determining the relationship between the first priority of the PUSCH configured by the semi-persistent scheduling and the second priority of the PUSCH configured by the dynamic scheduling includes the following.

At block S202, the period of the first PUSCH is compared with the preset period.

At block S203, in a case where the period of the first PUSCH is shorter than the preset period, it is determined that the first priority is higher than the second priority, or in a case where the period of the first PUSCH is longer than the preset period, it is determined that the second priority is higher than the first priority.

In an embodiment, the preset period may be pre-configured by the base station for the terminal or may be pre-appointed by the base station and the terminal through a communication protocol.

In an embodiment, when the period of the first PUSCH is relatively short, for example, the period of the first PUSCH is shorter than the preset period, an interval at which the terminal uploads the first PUSCH is short. In this case, the latency of sending the PUSCH each time by the terminal to the base station is short. This configuration is more likely made for the services that the allowed latency is low, such as URLLC.

When the period of the first PUSCH is relatively long, for example, the period of the first PUSCH is longer than the preset period, an interval at which the terminal uploads the first PUSCH is long. In this case, the latency of sending the PUSCH each time by the terminal to the base station is long. This configuration is more likely made for the services that the allowed latency is high, such as eMBB.

For the case where the period of the first PUSCH is shorter than the preset period, it can be determined that the first priority is higher than the second priority, thereby ensuring that the first PUSCH for the service requiring low latency can be uploaded timely to meet the latency requirement of the service. For the case where the period of the first PUSCH is longer than the preset period, it can be determined that the second priority is higher than the first priority, thereby ensuring that the second PUSCH for the service requiring high latency can be uploaded timely, to meet the latency requirement of the service.

For a case where the period of the first PUSCH equals to the preset period, it can be determined that the first priority is higher than the second priority or the second priority is higher than the first priority, which can be set as required.

Figure 4:
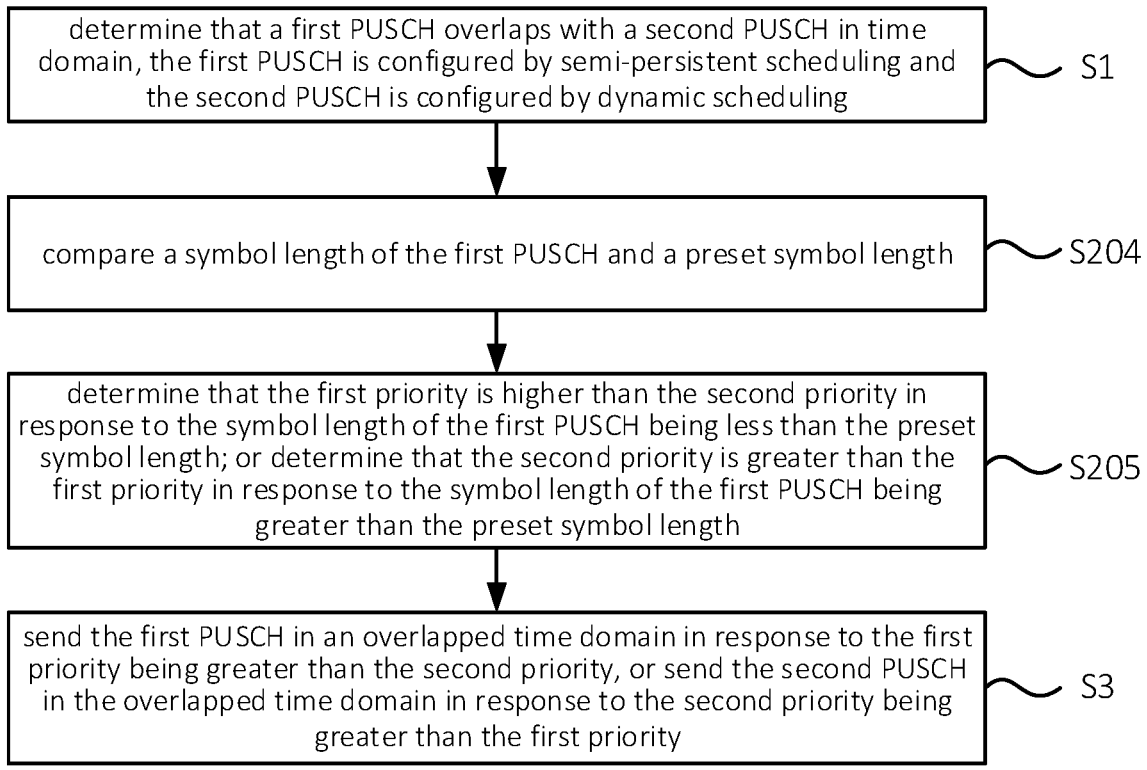
FIG. 4 is a schematic flowchart illustrating still another PUSCH transmission method according to embodiments of the disclosure.

FIG. 4 is a schematic flowchart illustrating still another PUSCH transmission method according to embodiments of the disclosure. As illustrated in FIG. 4, the high-layer signaling is configured to configure the terminal to compare a symbol length of the first PUSCH with a preset symbol length. Determining the relationship between the first priority of the PUSCH configured by the semi-persistent scheduling and the second priority of the PUSCH configured by the dynamic scheduling includes the following.

At block S204, the symbol length of the first PUSCH is compared with a preset symbol length.

At block S205, in a case where the symbol length of the first PUSCH is less than the preset symbol length, it is determined that the first priority is higher than the second priority, or in a case where the symbol length of the first PUSCH is greater than the preset symbol length, it is determined that the second priority is higher than the first priority.

In an embodiment, the preset symbol length may be pre-configured by the base station for the terminal, or may be pre-appointed by the base station and the terminal through a communication protocol.

In an embodiment, when the symbol length of the first PUSCH is relatively short, for example, the symbol length of the first PUSCH is less than the preset symbol length, the time spent by the terminal to upload the first PUSCH is relatively short. In this case, the speed of sending the PUSCH each time by the terminal to the base station each time is fast. This configuration is more likely made for the services that the allowed latency is low, such as URLLC.

When the symbol length of the first PUSCH is relatively long, for example, the symbol length of the first PUSCH is greater than the preset symbol length, the time spent by the terminal to upload the first PUSCH is relatively long. In this case, the speed of sending the PUSCH each time by the terminal to the base station is slow. This configuration is more likely made for the services that the allowed latency is high, such as eMBB.

For the case where the symbol length of the first PUSCH is less than the preset symbol length, it can be determined that the first priority is higher than the second priority, thereby ensuring that the first PUSCH for the services requiring low latency can be uploaded timely to meet the latency requirement of the services. For the case where the symbol length of the first PUSCH is greater than the preset symbol length, it can be determined that the second priority is higher than the first priority, thereby ensuring that the second PUSCH for the services requiring high latency can be uploaded timely, to meet the latency requirement of the services.

For the case where the symbol length of the first PUSCH equals to the preset symbol length, it can be determined that the first priority is higher than the second priority, or the second priority is higher than the first priority, which can be set as required.

Figure 5:
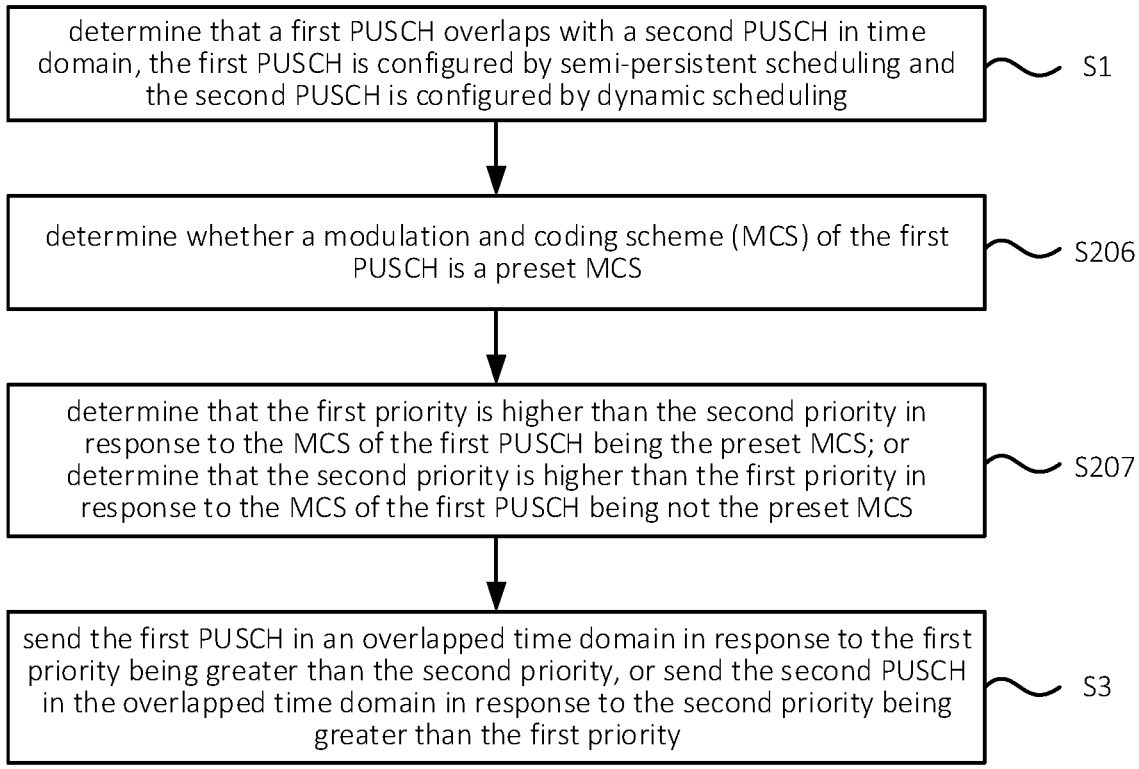
FIG. 5 is a schematic flowchart illustrating still another PUSCH transmission method according to embodiments of the disclosure.

FIG. 5 is a schematic flowchart illustrating still another PUSCH transmission method according to embodiments of the disclosure. As illustrated in FIG. 5, the high-layer signaling is configured to configure the terminal to determine whether the modulation and coding scheme (MCS) of the first PUSCH is a preset MCS. Determining the relationship between the first priority of the PUSCH configured by the semi-persistent scheduling and the second priority of the PUSCH configured by the dynamic scheduling includes the following.

At block S206, it is determined whether the modulation and coding scheme (MCS) of the first PUSCH is the preset MCS.

At block S207, in a case where the MCS of the first PUSCH is the preset MCS, it is determined that the first priority is higher than the second priority, or in a case where the MCS of the first PUSCH is not the preset MCS, it is determined that the second priority is higher than the first priority.

In an embodiment, the base station may instruct the MCS of the first PUSCH to the terminal through the high-layer signaling, and the terminal may determine whether the MCS indicated by the high-layer signaling is the preset MCS. When the MCS of the first PUSCH is the preset MCS, it is determined that the first priority is higher than the second priority, or when the MCS of the first PUSCH is not the preset MCS, it is determined that the second priority is higher than the first priority.

The MCS includes two aspects of information: modulation and coding rate. Multiple MCS tables are provided in the 3GPP protocol TS 38.214. Each MCS table contains multiple MCS options. Different MCS tables are suitable for transmitting different types of services due to their different maximum modulation orders and corresponding coding rates.

The preset MCS can be one or more MCSs in an MCS table of 64QAM (quadrature amplitude modulation) and low spectrum efficiency or the MAC table itself. In a case where the MCS of the first PUSCH is configured as the one or more MCSs in the MCS table of 64QAM and low spectrum efficiency or the MCS table itself, it can be determined that the first priority is higher than the second priority.

Figure 6:
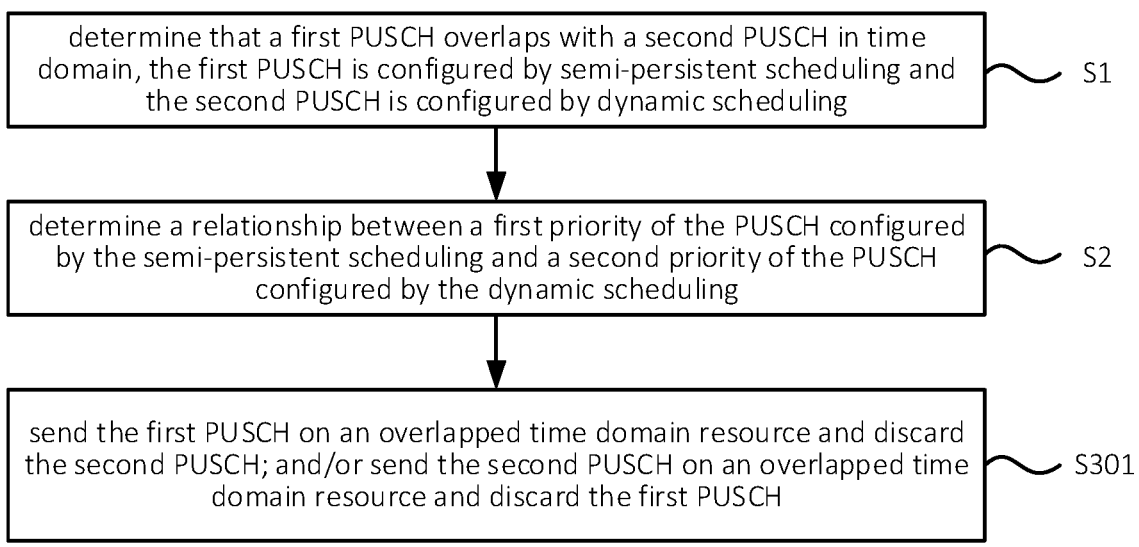
FIG. 6 is a schematic flowchart illustrating still another PUSCH transmission method according to embodiments of the disclosure.

FIG. 6 is a schematic flowchart illustrating still another PUSCH transmission method according to embodiments of the disclosure. As illustrated in FIG. 6, sending the first PUSCH in the overlapped time domain includes, at block S0301, sending the first PUSCH on the overlapped time domain resources and discarding the second PUSCH; and/or sending the second PUSCH in the overlapped time domain includes sending the second PUSCH on the overlapped time domain resources, and discarding the first PUSCH.

In an embodiment, the terminal can send the first PUSCH in the overlapped time domain and completely discard the second PUSCH (i.e., the terminal does not send the second PUSCH). The terminal can send the second PUSCH in the overlapped time domain and completely discard the first PUSCH (i.e., the terminal does not send the first PUSCH).

Accordingly, the overlap between the first PUSCH and the second PUSCH on the subsequent time domain resources can be avoided, to prevent the terminal from comparing the first priority and the second priority again.

Figure 7:
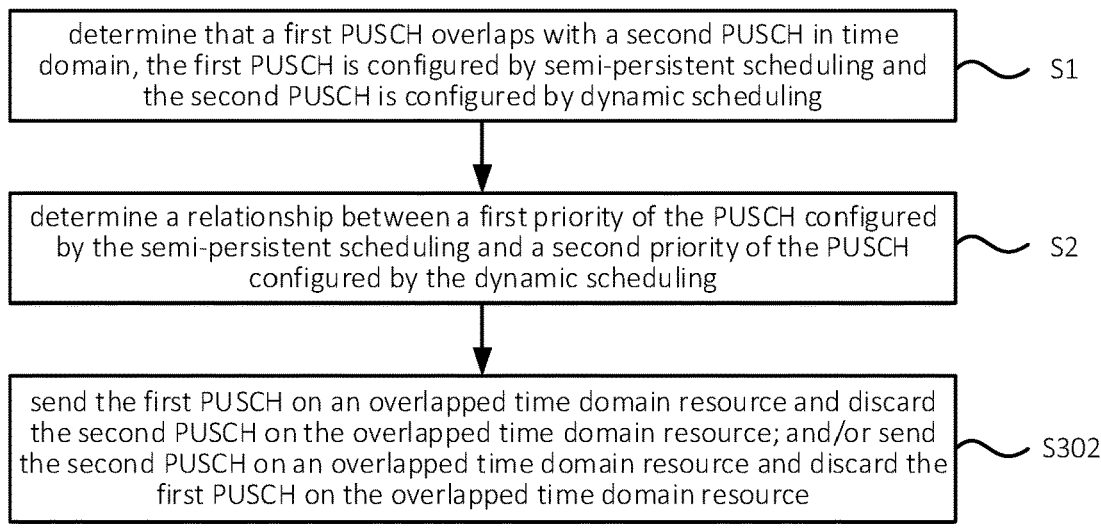
FIG. 7 is a schematic flowchart illustrating still another PUSCH transmission method according to embodiments of the disclosure.

FIG. 7 is a schematic flowchart illustrating still another PUSCH transmission method according to embodiments of the disclosure. As illustrated in FIG. 7, sending the first PUSCH in the overlapped time domain includes, at block S0302, sending the first PUSCH on the overlapped time domain resources and discarding the second PUSCH on the overlapped time domain resources; and/or sending the second PUSCH in the overlapped time domain includes sending the second PUSCH on the overlapped time domain resources and discarding the first PUSCH on the overlapped time domain resources.

In an embodiment, the terminal can send the first PUSCH in the overlapped time domain, only discard the second PUSCH on the overlapped time domain resources, and still send the second PUSCH on other subsequent time domain resources (the first PUSCH overlaps with the second PUSCH on other subsequent time domain resources, and the process is performed by comparing the priorities according to a manner mentioned in foregoing embodiments). The terminal can send the second PUSCH in the overlapped time domain, only discard the first PUSCH on the overlapped time domain resources, and send the first PUSCH on other subsequent time domain resources.

Accordingly, the PUSCH that is not sent on the overlapped resources can be sent on other subsequent time domain resources to ensure that the data in the PUSCH can be received by the base station.

Figure 8:
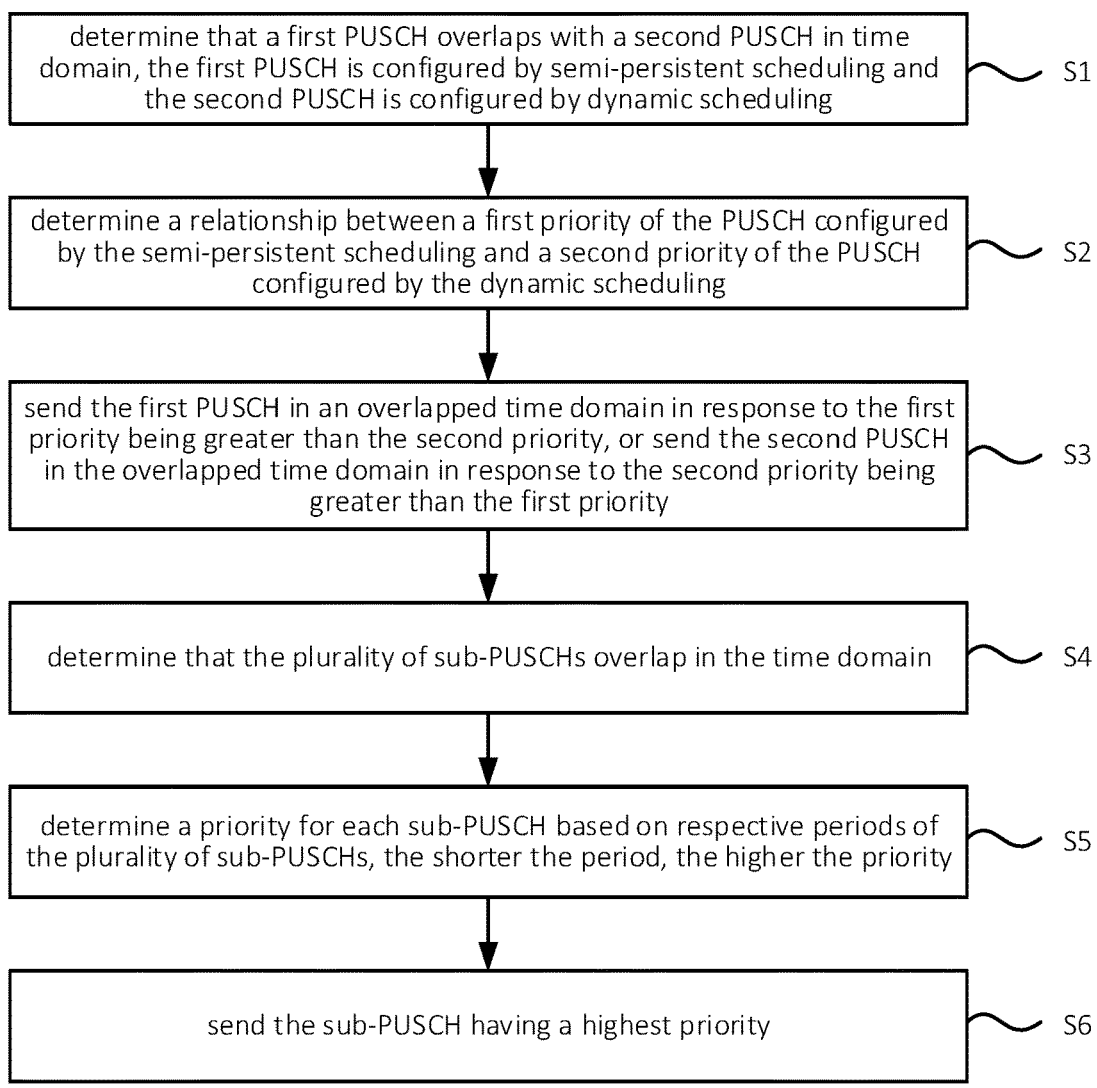
FIG. 8 is a schematic flowchart illustrating still another PUSCH transmission method according to embodiments of the disclosure.

FIG. 8 is a schematic flowchart illustrating still another PUSCH transmission method according to embodiments of the disclosure. As illustrated in FIG. 8, the first PUSCH includes multiple sub-PUSCHs, and the method further includes the following.

At block S4, it is determined that multiple sub-PUSCHs overlap in the time domain.

At block S5, a priority is determined for each of the multiple sub-PUSCHs based on a period of each sub-PUSCH. The shorter the period, the higher the priority is.

At block S6, the sub-PUSCH with the highest priority is sent.

The blocks S4 to S6 can be executed after the block S3, illustrated as FIG. 8. The execution order can be adjusted as needed. For example, the block S4 may be executed in parallel with the block S1, or executed before the block S1.

In an embodiment, the base station can set multiple semi-persistent scheduling configurations for the terminal. The terminal can send the PUSCHs to the base station respectively based on the periods of the configurations. The PUSCHs sent by the terminal to the base station based on different periods of the semi-persistent scheduling configurations are called sub-PUSCHs. The multiple sub-PUSCHs may overlap in the time domain. In this case, the priority of the sub-PUSCH is determined based on the period of the sub-PUSCH. Since the shorter the period, the more likely it is to be configured for services that the allowed latency is low. Therefore, for the PUSCH with a shorter period, the higher the priority is determined. The sub-PUSCH with the highest priority is sent, to meet the latency requirement of the services requiring low latency.

Figure 9:
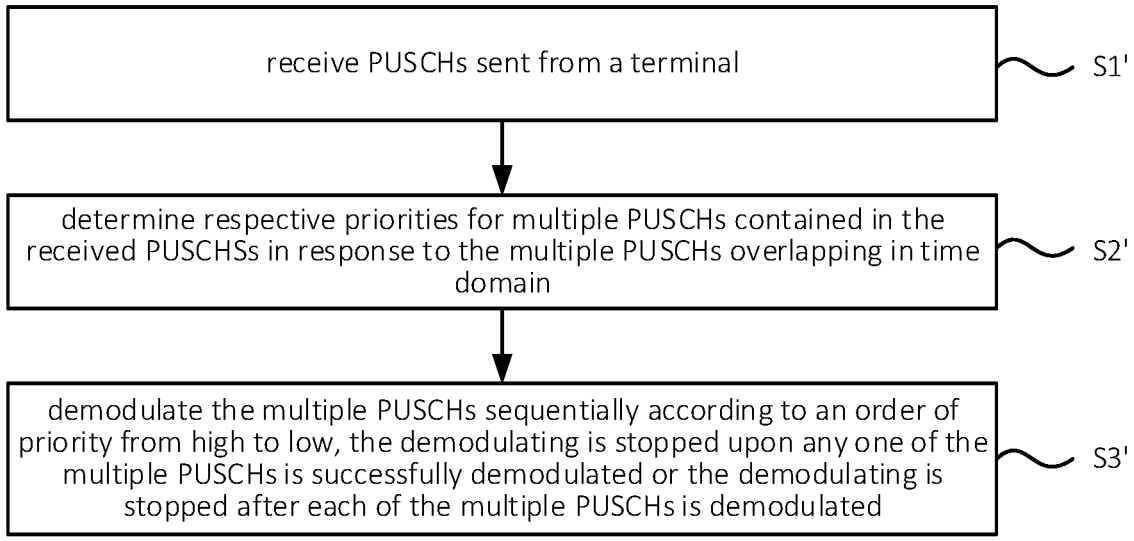
FIG. 9 is a schematic flowchart illustrating a PUSCH receiving method according to embodiments of the disclosure.

FIG. 9 is a schematic flowchart illustrating a PUSCH receiving method according to embodiments of the disclosure. As illustrated in FIG. 9, the PUSCH receiving method illustrated in this embodiment can be applied to a base station. The base station can communicate with a terminal, for example based on 5G NR. The terminal can be a mobile phone, a tablet computer, a wearable device, or other electronic devices.

As illustrated in FIG. 9, the PUSCH receiving method may include the following.

At block S1', PUSCHs sent by the terminal are received;

At block S2', in a case where multiple PUSCHs in the received PUSCHs overlap in the time domain, priorities of the multiple PUSCHs are determined.

At block S3', the multiple PUSCHs are sequentially demodulated based on an order of priority from high to low.

The demodulation is stopped upon any one of the multiple PUSCHs is successfully demodulated or the demodulation is stopped after each of the multiple PUSCHs is demodulated.

In an embodiment, the base station can configure the PUSCHs for the terminal in different scheduling manners, such as semi-persistent scheduling and dynamic scheduling. The terminal can send multiple PUSCHs to the base station based on the configuration made by the base station, and the multiple sent PUSCHs can overlap in the time domain.

When the base station receives the multiple PUSCHs that overlap in the time domain, for example, the base station receives, on a bandwidth part (BWP) of a certain service cell, multiple PUSCHs that overlap in the time domain, the base station can determine the priorities of multiple PUSCHs respectively. The relationship between the priorities of the multiple PUSCHs may be configured by the base station when configuring the PUSCH for the terminal. The terminal may send the PUSCH with the highest priority on the overlapped time domain resources. Although the terminal does not send other PUSCHs on the overlapped time domain resources (which means the terminal does not have uplink data in the PUSCHs), the base station still needs to receive the PUSCHs, but no data is obtained by demodulating the received PUSCHs.

Further, the base station can sequentially demodulate the multiple PUSCHs according to the priority from high to low. For example, for the first PUSCH configured by the semi-persistent scheduling and the second PUSCH configured by the dynamic scheduling, if the base station determines the priority of the first PUSCH sent by the terminal this time is higher, the first PUSCH can be demodulated first. If the first PUSCH is successfully demodulated (that is, data is obtained by demodulating the first PUSCH), the base station can determine that the terminal sends the first PUSCH on the overlapped time domain resources (that is, the terminal sends the uplink data through the first PUSCH) and the terminal does not send the uplink data through the second PUSCH with the lower priority. Therefore, there is no need to demodulate the second PUSCH. Accordingly, it is beneficial to reduce the overhead of demodulating the PUSCH by the base station.

Figure 10:
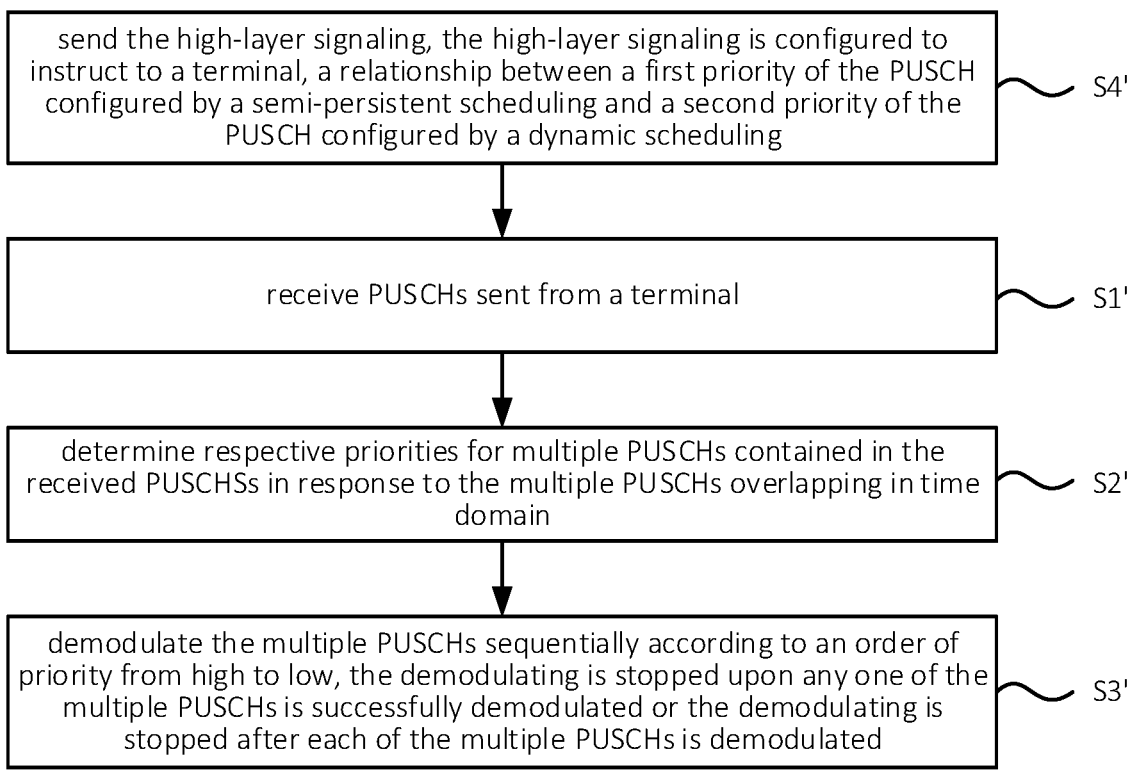
FIG. 10 is a schematic flowchart illustrating another PUSCH receiving method according to embodiments of the disclosure.

FIG. 10 is a schematic flowchart illustrating another PUSCH receiving method according to embodiments of the disclosure. As illustrated in FIG. 10, the method further includes the following.

At block S4', a high-layer signaling is sent to the terminal. The high-layer signaling is configured to indicate the relationship between first priority of the PUSCH configured by the semi-persistent scheduling and the second priority of the PUSCH configured by the dynamic scheduling to the terminal.

In an embodiment, the base station may instruct to the terminal, in the high-layer signaling sent to the terminal, the relationship between the first priority of the PUSCH configured by the semi-persistent scheduling and the second priority of the PUSCH configured by the dynamic scheduling. Therefore, when the first PUSCH configured by the semi-persistent scheduling overlaps with the second PUSCH configured by the dynamic scheduling in the time domain, the terminal can determine the relationship between the first priority of the PUSCH configured by the semi-persistent scheduling and the second priority of the PUSCH configured by the dynamic scheduling based on the high-layer signaling. When the first priority is higher than the second priority, the first PUSCH is sent in the overlapped time domain, or when the second priority is higher than the first priority, the second PUSCH is sent in the overlapped time domain.

Accordingly, the terminal will not directly discard the first PUSCH, but compare the priorities of the PUSCHs configured by the semi-persistent scheduling and the dynamic scheduling. The PUSCH, configured by a corresponding scheduling manner, with the higher priority is sent. Therefore, when the PUSCH configured in the two scheduling manners face the services with different latency requirements, the priorities of the PUSCHs can be determined based on the latency requirement of each service. The PUSCH, configured in the corresponding scheduling manner, with the higher priority is sent preferentially to meet the latency requirement of the service.

Optionally, the high-layer signaling includes at least one of a radio resource control message or a media access control message.

Optionally, the high-layer signaling is configured to configure the terminal to compare a period of the first PUSCH with a preset period.

Optionally, the high-layer signaling is configured to configure the terminal to compare a symbol length of the first PUSCH with a preset symbol length.

Optionally, the high-layer signaling is configured to configure the terminal to determine whether a modulation and coding scheme (MCS) of the first PUSCH is a preset MCS.

Corresponding to the foregoing embodiments of the PUSCH transmission method and the PUSCH receiving method, the disclosure also provides embodiments of a PUSCH transmission device and a PUSCH receiving device.

Figure 11:
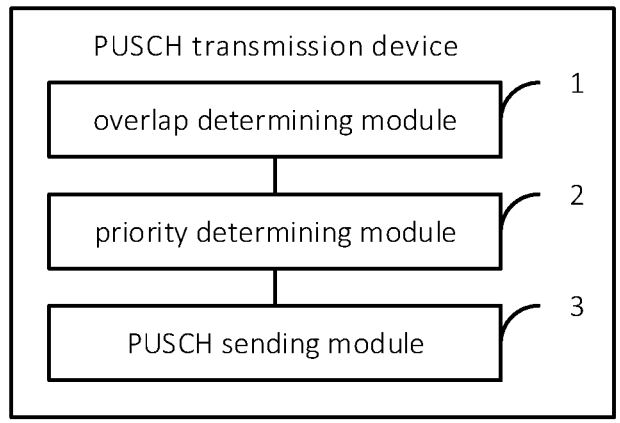
FIG. 11 is a block diagram illustrating a PUSCH transmission device according to embodiments of the disclosure.

FIG. 11 is a block diagram illustrating a PUSCH transmission device according to embodiments of the disclosure.

As illustrated in FIG. 11, the PUSCH transmission device shown in this embodiment can be applied to a terminal. The terminal can be a mobile phone, a tablet computer, a wearable device, and other electronic devices. The terminal can communicate with a base station, for example, based on 5G NR (New Radio).

As illustrated in FIG. 11, the PUSCH transmission method may include an overlap determining module 1, a priority determining module 2, and a PUSCH sending module 3.

The overlap determining module 1 is configured to determine that the first PUSCH overlaps with the second PUSCH in the time domain. The first PUSCH is configured by semi-persistent scheduling, and the second PUSCH is configured by dynamic scheduling.

The priority determining module 2 is configured to determine a relationship between a first priority of the PUSCH configured by the semi-persistent scheduling and a second priority of the PUSCH configured by the dynamic scheduling.

The PUSCH sending module 3 is configured to send the first PUSCH in an overlapping time domain when the first priority is higher than the second priority, or send the second PUSCH in the overlapped time domain when the second priority is higher than the first priority.

Optionally, the relationship between the first priority and the second priority is determined based on a high-layer signaling sent by the base station.

Optionally, the high-layer signaling includes at least one of: a radio resource control message or a media access control message.

Figure 12:
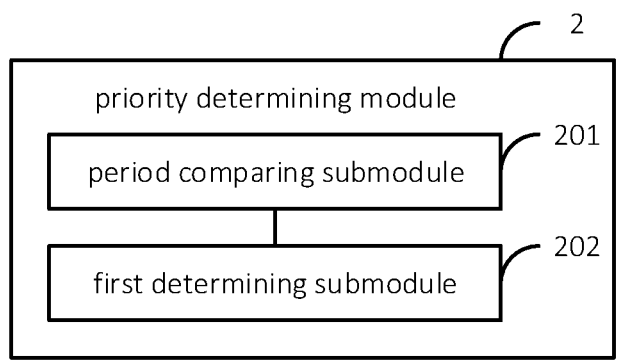
FIG. 12 is a block diagram illustrating a priority determining module according to embodiments of the disclosure.

FIG. 12 is a block diagram illustrating a priority determining module according to embodiments of the disclosure. As illustrated in FIG. 12, the high-layer signaling is configured to configure the terminal to compare a period of the first PUSCH with a preset period. The priority determining module 2 includes a period comparing submodule 201 and a first determining submodule 202.

The period comparing submodule 201 is configured to compare the period of the first PUSCH with the preset period.

The first determining submodule 202 is configured to determine that the first priority is higher than the second priority when the period of the first PUSCH is longer than the preset period, or determine that the second priority is higher than the first priority when the period of the PUSCH is shorter than the preset period.

Figure 13:
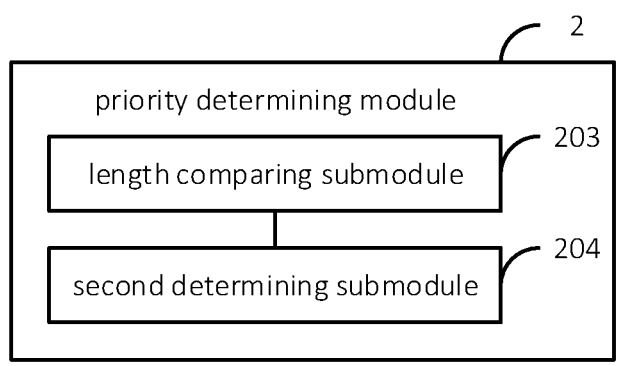
FIG. 13 is a block diagram illustrating another priority determining module according to embodiments of the disclosure.

FIG. 13 is a block diagram illustrating another priority determining module according to embodiments of the disclosure. As illustrated in FIG. 13, the high-layer signaling is configured to configure the terminal to compare a symbol length of the first PUSCH with a preset symbol length. The priority determining module 2 includes a length comparing submodule 203 and a second determining submodule 204.

The length comparing submodule 203 is configured to compare the symbol length of the first PUSCH with the preset symbol length.

The second determining submodule 204 is configured to determine that the first priority is higher than the second priority when the symbol length of the first PUSCH is less than the preset symbol length, or determine that the second priority is higher than the first priority when the symbol length of the first PUSCH is greater than the preset symbol length.

Figure 14:
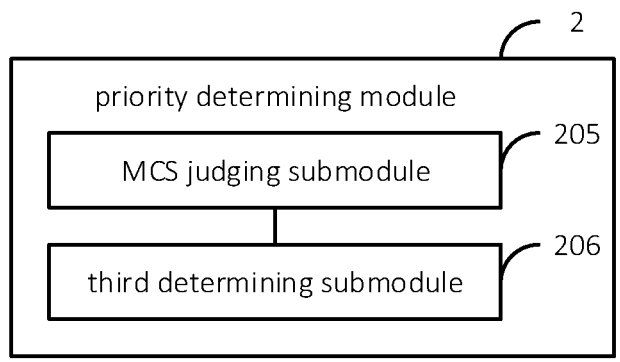
FIG. 14 is a block diagram illustrating still another priority determining module according to embodiments of the disclosure.

FIG. 14 is a block diagram illustrating still another priority determining module according to embodiments of the disclosure. As illustrated in FIG. 14, the high-layer signaling is configured to configure the terminal to determine whether a modulation and coding scheme (MCS) of the first PUSCH is a preset MCS. The priority determining module 2 includes a MCS judging submodule 205 and a third determining submodule 206.

The MCS judging submodule 205 is configured to judge whether the modulation and coding scheme (MCS) of the first PUSCH is the preset MCS.

The third determining submodule 206 is configured to determine that the first priority is higher than the second priority when the MCS of the first PUSCH is the preset MCS, or determine that the second priority is higher than the first priority when the MCS of the PUSCH is not the preset MCS.

Optionally, the PUSCH sending module is configured to send the first PUSCH on overlapped time domain resources and discard the second PUSCH; and/or send the second PUSCH on overlapped time domain resources and discard the first PUSCH.

Optionally, the PUSCH sending module is configured to send the first PUSCH on overlapped time domain resources and discard the second PUSCH on the overlapped time domain resources; and/or send the second PUSCH on the overlapped time domain resources and discard the first PUSCH on the overlapped time domain resources.

Optionally, the first PUSCH includes multiple sub-PUSCHs. The overlap determining module is further configured to determine that the multiple sub-PUSCHs overlap in the time domain. The priority determining module is further configured to determine the priority of each sub-PUSCH based on a period of each sub-PUSCH, where the shorter the period, the higher the priority. The PUSCH sending module is further configured to send the sub-PUSCH with the highest priority.

Figure 15:
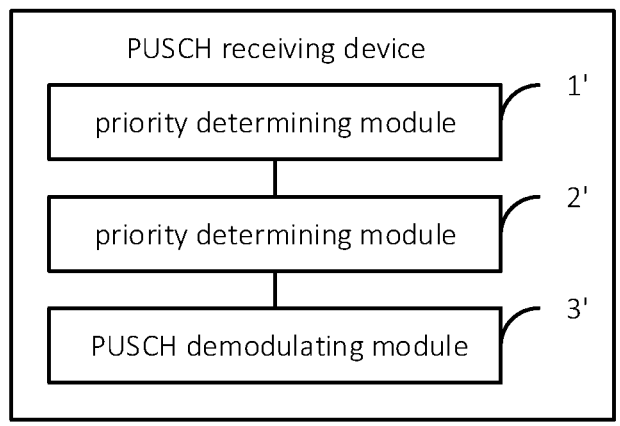
FIG. 15 is a block diagram illustrating a PUSCH receiving device according to embodiments of the disclosure.

FIG. 15 is a block diagram illustrating a PUSCH receiving device according to embodiments of the disclosure. As illustrated in FIG. 15, the PUSCH receiving device illustrated in this embodiment can be applied to a base station. The base station can communicate with a terminal, for example, based on 5G NR. The terminal can be a mobile phone, a tablet computer, a wearable device. or other electronic devices.

As illustrated in FIG. 15, the PUSCH receiving device may include a PUSCH receiving module 1', a priority determining module 2', and a PUSCH demodulating module 3'.

The PUSCH receiving module 1' is configured to receive PUSCHs sent by the terminal.

The priority determining module 2' is configured to determine priorities of multiple PUSCHs contained in the received PUSCHs, in the case that the multiple PUSCHs overlap in the time domain.

The PUSCH demodulating module 3' is configured to demodulate the multiple PUSCHs sequentially according to an order of priority from high to low.

The demodulation is stopped upon any one of the multiple PUSCHs is successful demodulated, or the demodulation is stopped after each of the multiple PUSCHs is demodulated.

Figure 16:
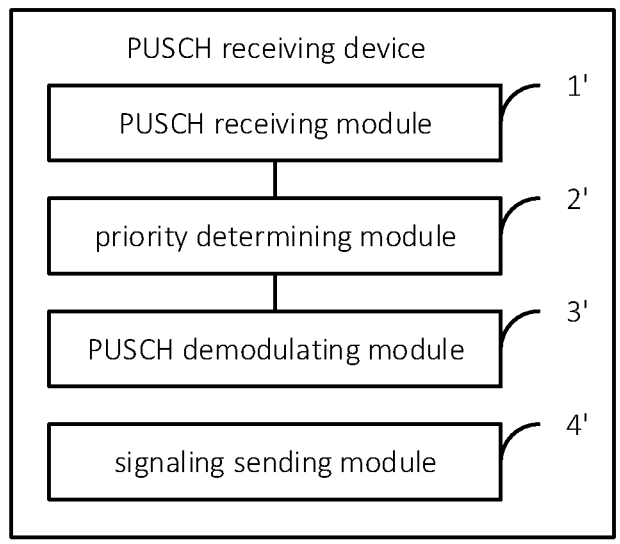
FIG. 16 is a block diagram illustrating another PUSCH receiving device according to embodiments of the disclosure.

FIG. 16 is a block diagram illustrating another PUSCH receiving device according to embodiments of the disclosure. As illustrated in FIG. 16, the device further includes a signaling sending module 4'.

The signaling sending module 4' is configured to send a high-layer signaling to the terminal. The high-layer signaling is configured to instruct to the terminal, a relationship between a first priority of the PUSCH configured by the semi-persistent scheduling and a second priority of the PUSCH configured by the dynamic scheduling.

Optionally, the high-layer signaling includes at least one of a radio resource control message or a media access control message.

Optionally, the high-layer signaling is configured to configure the terminal to compare a period of the first PUSCH with a preset period.

Optionally, the high-layer signaling is configured to configure the terminal to compare a symbol length of the first PUSCH with a preset symbol length.

Optionally, the high-layer signaling is configured to configure the terminal to determine whether a modulation and coding scheme (MCS) of the first PUSCH is a preset MCS.

Regarding the device in the foregoing embodiments, the specific manner in which each module performs operations has been described in detail in the embodiments of the related method, and will not be elaborated here.

As for the device embodiments, since they basically correspond to the method embodiments, the descriptions of the method embodiments can be referred to. The device embodiments described above are merely illustrative. The modules described as separate components may or may not be physically separated, and the components displayed as modules may or may not be physical modules, that is, they may be located in one place, or distributed to multiple network modules. Some or all the modules can be selected according to actual needs to achieve the objectives of the solutions of the embodiments. Those of ordinary skill in the art can understand and implement the disclosure without creative work.

Embodiments of the disclosure also provide an electronic device, including a processor, and a memory configured to store instructions executable by the processor.

The processor is configured to implement the PUSCH transmission method described in any of the foregoing embodiments.

Embodiments of the disclosure further provides an electronic device, including a processor and a memory configured to store instructions executable by the processor.

The processor is configured to implement the PUSCH receiving method according to any one of the foregoing embodiments.

Embodiments of the disclosure also provide a computer-readable storage medium, having computer programs stored thereon. When the programs are executed by a processor, the PUSCH transmission method described in any of the above embodiments is implemented.

Embodiments of the disclosure also provide a computer-readable storage medium, having computer programs stored thereon. When the programs are executed by a processor, the PUSCH receiving method described in any of the above embodiments is implemented.

With the embodiments of the disclosure, when the first PUSCH configured by the semi-persistent scheduling overlaps with the second PUSCH configured by the dynamic scheduling in the time domain, the relationship between the first priority of the PUSCH configured by the semi-persistent scheduling and the second priority of the PUSCH configured by the dynamic scheduling can be determined. When the first priority is higher than the second priority, the first PUSCH is sent in the overlapped time domain or when the second priority is higher than the first priority, the second PUSCH is sent in the overlapped time domain.

Accordingly, the terminal may not directly discard the first PUSCH, but compare the priorities of the PUSCHs configured by the semi-persistent scheduling and the dynamic scheduling and send the PUSCH, configured in a corresponding scheduling manner, with the higher priority. Therefore, when the PUSCHs configured in the two scheduling manners face services with different delay requirements, the priorities of the PUSCHs can be determined based on the latency requirement of the service, such that the PUSCH configured in the corresponding scheduling manner with the higher priority is sent preferentially to meet the latency requirement of the service.

Figure 17:
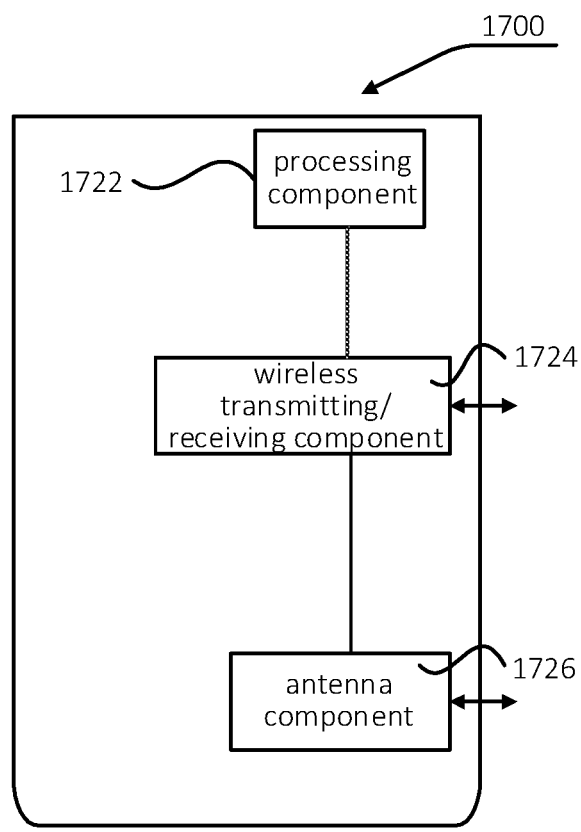
FIG. 17 is a block diagram illustrating a device for PUSCH receiving according to embodiments of the disclosure.

As illustrated in FIG. 17, FIG. 17 is a block diagram illustrating a device 1700 for PUSCH receiving according to embodiments of the disclosure. The device 1700 may be provided as a base station. As illustrated in FIG. 17, the device 1700 includes a processing component 1722, a wireless transmitting/receiving component 1724, an antenna component 1726, and a signal processing part specific to a wireless interface. The processing component 1722 further includes one or more processors. One of the processors in the processing component 1722 may be configured to implement the PUSCH receiving method described in any of the foregoing embodiments.

Figure 18:
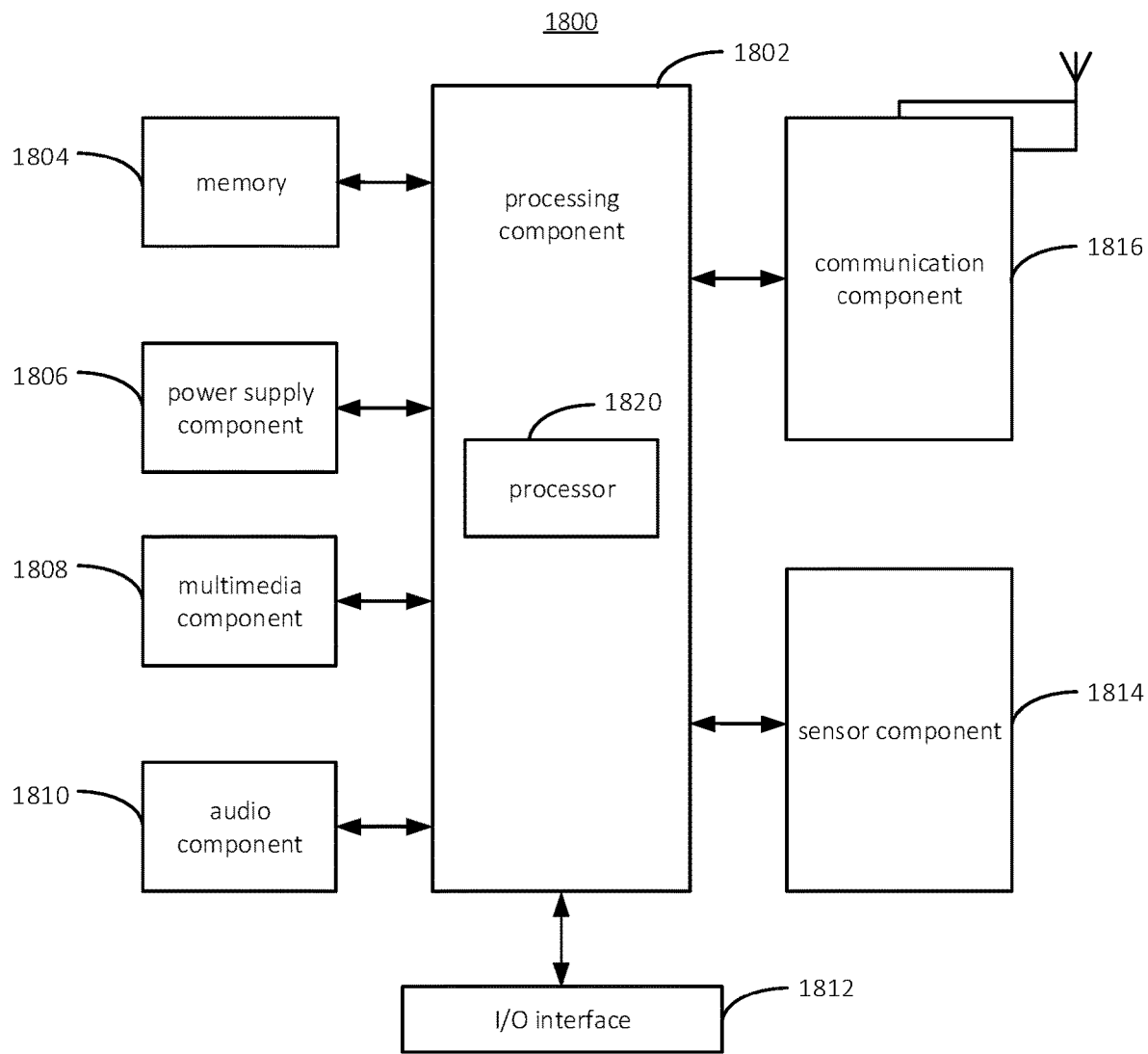
FIG. 18 is a block diagram illustrating a device for PUSCH transmission according to embodiments of the disclosure.

FIG. 18 is a block diagram illustrating a device 1800 for PUSCH transmission according to embodiments of the disclosure. For example, the device 1800 may be a mobile phone, a computer, a digital broadcasting terminal, a messaging device, a game console, a tablet device, a medical device, a fitness device, a personal digital assistant, etc.

As illustrated in FIG. 18, the device 1800 may include one or more of the following components: a processing component 1802, a memory 1804, a power supply component 1806, a multimedia component 1808, an audio component 1810, an input/output (I/O) interface 1812, a sensor component 1814, and a communication component 1816.

The processing component 1802 generally controls the overall operations of the device 1800, such as operations associated with display, telephone calls, data communications, camera operations, and recording operations. The processing component 1802 may include one or more processors 1820 to execute instructions to complete all or part of the blocks of the foregoing method. In addition, the processing component 1802 may include one or more modules to facilitate the interaction between the processing component 1802 and other components. For example, the processing component 1802 may include a multimedia module to facilitate the interaction between the multimedia component 1808 and the processing component 1802.

The memory 1804 is configured to store various types of data to support the operation of the device 1800. Examples of such data include instructions for any application or method operating on the device 1800, contact data, phone book data, messages, pictures, videos, etc. The memory 1804 can be implemented by any type of volatile or non-volatile storage device or their combination, such as static random-access memory (SRAM), electrically erasable programmable read-only memory (EEPROM), erasable and programmable read-only memory (EPROM), programmable read-only memory (PROM), read-only memory (ROM), magnetic memory, flash memory, magnetic disk, or optical disk.

The power supply component 1806 provides power to the various components of the device 1800. The power supply component 1806 may include a power management system, one or more power supplies, and other components associated with the generation, management, and distribution of power for the device 1800.

The multimedia component 1808 includes a screen that provides an output interface between the device 1800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of a touch or slide action, but also detect the duration and pressure related to the touch or slide operation. In some embodiments, the multimedia component 1808 includes a front camera and/or a rear camera. When the device 1800 is in an operation mode, such as a shooting mode or a video mode, the front camera and/or the rear camera can receive external multimedia data. Each front camera and rear camera can be a fixed optical lens system or have focal length and optical zoom capabilities.

The audio component 1810 is configured to output and/or input audio signals. For example, the audio component 1810 includes a microphone (MIC). When the device 1800 is in an operation mode, such as a call mode, a recording mode, and a voice recognition mode, the microphone is configured to receive external audio signals. The received audio signal may be further stored in the memory 1804 or transmitted via the communication component 1816. In some embodiments, the audio component 1810 further includes a speaker for outputting audio signals.

The I/O interface 1812 provides an interface between the processing component 1802 and a peripheral interface module. The above-mentioned peripheral interface module may be a keyboard, a click wheel, a button, and the like. These buttons may include but are not limited to: home button, volume button, start button, and lock button.

The sensor component 1814 includes one or more sensors for providing the device 1800 with various aspects of status assessment. For example, the sensor component 1814 can detect the on/off status of the device 1800 and the relative positioning of the components. For example, the component is the display and the keypad of the device 1800. The sensor component 1814 can also detect the position change of the device 1800 or a component of the device 1800, the presence or absence of contact between the user and the device 1800, the orientation or acceleration/deceleration of the device 1800, and the temperature change of the device 1800. The sensor assembly 1814 may include a proximity sensor configured to detect the presence of nearby objects when there is no physical contact. The sensor component 1814 may also include a light sensor, such as a CMOS or CCD image sensor, for use in imaging applications. In some embodiments, the sensor component 1814 may also include an acceleration sensor, a gyroscope sensor, a magnetic sensor, a pressure sensor, or a temperature sensor.

The communication component 1816 is configured to facilitate wired or wireless communication between the device 1800 and other devices. The device 1800 can access a wireless network based on a communication standard, such as WiFi, 2G or 3G, 4G LTE, 5G NR, or a combination thereof. In an exemplary embodiment, the communication component 1816 receives a broadcast signal or broadcast related information from an external broadcast management system via a broadcast channel. In an exemplary embodiment, the communication component 1816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 1800 may be implemented by one or more application specific integrated circuits (ASICs), digital signal processors (DSP), digital signal processing devices (DSPD), programmable logic devices (PLD), a field programmable gate array (FPGA), a controller, a microcontroller, a microprocessor, or other electronic components, to implement the PUSCH transmission method described in any of the foregoing embodiments.

In exemplary embodiments, there is also provided a non-transitory computer-readable storage medium including instructions, such as a memory 1804 including instructions, which can be executed by the processor 1820 of the device 1800 to complete the foregoing method. For example, the non-transitory computer-readable storage medium may be ROM, random access memory (RAM), CD-ROM, magnetic tape, floppy disk, optical data storage device, etc.

After considering the specification and practicing the disclosure herein, those skilled in the art will easily find other embodiments of the disclosure. The disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The description and the embodiments are to be regarded as exemplary only, and the true scope and spirit of the disclosure are pointed out by the following claims.

It is to be understood that the disclosure is not limited to the precise structure that has been described above and shown in the drawings, and various modifications can be made without departing from its scope. The scope of the disclosure is only limited by the appended claims.

It is to be noted that in this article, relational terms such as first and second are only used to distinguish one entity or operation from another entity or operation, and do not necessarily require or imply any such actual relationship or sequence between these entities or operations. The terms "include", "comprise", or any other variants thereof are intended to cover non-exclusive inclusion, so that the process, method, article, or device that includes a series of elements includes not only those elements, but also other elements that are not explicitly listed, or also include elements inherent to such process, method, article, or equipment. If there are no more restrictions, the element defined by the sentence "including a . . . " does not exclude the existence of other identical elements in the process, method, article, or equipment that includes the element.

The methods and devices provided by the embodiments of the disclosure are described in detail above. Specific examples are used herein to illustrate the principles and implementations of the disclosure. The descriptions of the above embodiments are only used to help understand the method and its core idea. For the skilled in the art, according to the ideas of this disclosure, there may be some changes in the specific implementation and the scope of application. In conclusion, the disclosure is not limited to the content of this specification.

What is claimed is:

1. A physical uplink shared channel (PUSCH) transmission method, performed by a terminal, the method comprising:

determining that a first PUSCH overlaps with a second PUSCH in time domain, wherein the first PUSCH is configured by semi-persistent scheduling and the second PUSCH is configured by dynamic scheduling;

determining a relationship between a first priority of the PUSCH configured by the semi-persistent scheduling and a second priority of the PUSCH configured by the dynamic scheduling; and sending the first PUSCH in an overlapped time domain in response to the first priority being higher than the second priority; or sending the second PUSCH in the overlapped time domain in response to the second priority being higher than the first priority;

wherein determining the relationship between the first priority of the PUSCH configured by the semi-persistent scheduling and the second priority of the PUSCH configured by the dynamic scheduling comprises at least one of:

comparing a period of the first PUSCH and a preset period; and determining that the first priority is higher than the second priority in response to the period of the first PUSCH being shorter than the preset period; or determining that the second priority is higher than the first priority in response to the period of the first PUSCH being longer than the preset period;

comparing a symbol length of the first PUSCH and a preset symbol length; and determining that the first priority is higher than the second priority in response to the symbol length of the first PUSCH being less than the preset symbol length; or determining that the second priority is greater than the first priority in response to the symbol length of the first PUSCH being greater than the preset symbol length;

and, determining whether a modulation and coding scheme (MCS) of the first PUSCH is a preset MCS; and determining that the first priority is higher than the second priority in response to the MCS of the first PUSCH being the preset MCS; or determining that the second priority is higher than the first priority in response to the MCS of the first PUSCH being not the preset MCS.

2. The method of claim 1, wherein determining the relationship between the first priority of the PUSCH configured by the semi-persistent scheduling and the second priority of the PUSCH configured by the dynamic scheduling comprises:

determining the relationship between the first priority and the second priority based on a high-layer signaling sent by a base station.

3. The method of claim 2, wherein the high-layer signaling comprises at least one of:

a radio resource control message, or a media access control message.

4. The method of claim 2, wherein the high-layer signaling is configured to configure the terminal to compare the period of the first PUSCH and the preset period.

5. The method of claim 2, wherein the high-layer signaling is configured to configure the terminal to compare the symbol length of the first PUSCH and the preset symbol length.

6. The method of claim 2, wherein the high-layer signaling is configured to configure the terminal to determine whether the MCS of the first PUSCH is the preset MCS.

7. The method of claim 1, wherein one or both of sending the first PUSCH in the overlapped time domain comprises:

sending the first PUSCH on an overlapped time domain resource and discarding the second PUSCH; and sending the second PUSCH in the overlapped time domain comprises:

sending the second PUSCH on an overlapped time domain resource and discarding the first PUSCH.

8. The method of claim 1, wherein one or both of sending the first PUSCH in the overlapped time domain comprises:

sending the first PUSCH on an overlapped time domain resource and discarding the second PUSCH on the overlapped time domain resource; and sending the second PUSCH in the overlapped time domain comprises:

sending the second PUSCH on an overlapped time domain resource and discarding the first PUSCH on the overlapped time domain resource.

9. The method of claim 1, wherein the first PUSCH comprises a plurality of sub-PUSCHs, and the method comprises:

determining that the plurality of sub-PUSCHs overlap in the time domain;

determining a priority for each sub-PUSCH based on respective periods of the plurality of sub-PUSCHs, wherein the shorter the period, the higher the priority is; and sending the sub-PUSCH having a highest priority.

10. An electronic device, comprising:

a processor; and a memory, configured to store instructions executable by the processor;

wherein the processor is configured to:

determine that a first physical uplink shared channel (PUSCH) overlaps with a second PUSCH in time domain, wherein the first PUSCH is configured by semi-persistent scheduling and the second PUSCH is configured by dynamic scheduling;

determine a relationship between a first priority of the PUSCH configured by the semi-persistent scheduling and a second priority of the PUSCH configured by the dynamic scheduling; and send the first PUSCH in an overlapped time domain in response to the first priority being greater than the second priority, or send the second PUSCH in the overlapped time domain in response to the second priority being greater than the first priority;

wherein determining the relationship between the first priority of the PUSCH configured by the semi-persistent scheduling and the second priority of the PUSCH configured by the dynamic scheduling comprises at least one of:

comparing the period of the first PUSCH and the preset period; and determining that the first priority is higher than the second priority in response to the period of the first PUSCH being shorter than the preset period; or determining that the second priority is higher than the first priority in response to the period of the first PUSCH being longer than the preset period;

comparing a symbol length of the first PUSCH and a preset symbol length; and determining that the first priority is higher than the second priority in response to the symbol length of the first PUSCH being less than the preset symbol length; or determining that the second priority is greater than the first priority in response to the symbol length of the first PUSCH being greater than the preset symbol length;

and, determining whether a modulation and coding scheme (MCS) of the first PUSCH is a preset MCS; and determining that the first priority is higher than the second priority in response to the MCS of the first PUSCH being the preset MCS; or determining that the second priority is higher than the first priority in response to the MCS of the first PUSCH being not the preset MCS.

11. A non-transitory computer readable storage medium, having computer programs stored thereon, wherein when the programs are executed by a processor, a PUSCH transmission method of claim 1 is executed.

12. The electronic device of claim 10, wherein the processor is further configured to:
  determine the relationship between the first priority and the second priority based on a high-layer signaling sent by a base station.

* * * * *